(12) United States Patent
Kawarada

(10) Patent No.: US 8,687,080 B2
(45) Date of Patent: Apr. 1, 2014

(54) IMAGE PICKUP APPARATUS AND SIGNAL PROCESSOR

(75) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/724,214

(22) Filed: Mar. 15, 2010

(65) Prior Publication Data
US 2010/0238343 A1 Sep. 23, 2010

(30) Foreign Application Priority Data
Mar. 18, 2009 (JP) .................................. 2009-065435

(51) Int. Cl.
*H04N 5/235* (2006.01)
*H04N 9/73* (2006.01)

(52) U.S. Cl.
USPC .................................... 348/222.1; 348/224.1

(58) Field of Classification Search
USPC ............................. 348/224.1, 222.1; 600/109
See application file for complete search history.

(56) References Cited

U.S. PATENT DOCUMENTS

| | | | |
|---|---|---|---|
| 4,687,917 A * | 8/1987 | Kusaka et al. | 250/201.8 |
| 6,829,008 B1 * | 12/2004 | Kondo et al. | 348/302 |
| 7,671,318 B1 * | 3/2010 | Tener et al. | 250/208.1 |
| 2001/0043277 A1 * | 11/2001 | Tanaka et al. | 348/333.01 |
| 2008/0292301 A1 * | 11/2008 | Kikuchi | 396/354 |
| 2009/0002526 A1 * | 1/2009 | Koishi | 348/241 |

FOREIGN PATENT DOCUMENTS

| | | |
|---|---|---|
| CN | 1662039 A | 8/2005 |
| CN | 1758082 A | 4/2006 |
| CN | 1856022 A | 11/2006 |
| CN | 101015197 A | 8/2007 |
| JP | 60-086517 A | 5/1985 |
| JP | 03-113408 A | 5/1991 |
| JP | 05-323182 A | 12/1993 |
| JP | 07-062731 B | 7/1995 |
| JP | 07-298002 A | 11/1995 |
| JP | 08-278442 A | 10/1996 |
| JP | 11-258494 A | 9/1999 |
| JP | 2000-156823 A | 6/2000 |

(Continued)

OTHER PUBLICATIONS

The above references were cited in a Jun. 11, 2013 Office Action, which is enclosed without an English Translation, that issued in Japanese Patent Application No. 2009-065435.

(Continued)

*Primary Examiner* — Joel Fosselman
(74) *Attorney, Agent, or Firm* — Cowan, Liebowitz & Latman, P.C.

(57) ABSTRACT

An image pickup apparatus a camera 100 includes an image pickup element 105 including a plurality of imaging pixels 106 which perform a photoelectric conversion of an image formed by a light beam from an image pickup optical system and a plurality of focus detection pixels 107 which perform a photoelectric conversion of an image formed by a divided light beam of the light beam, a focus detector 113 which performs a focus detection of the image pickup optical system based on an output of the focus detection pixels 107, an aperture controller 104 which performs a control so that an aperture value of the image pickup optical system is equal to or less than a predetermined value when the focus detector 113 perform the focus detection, and an exposure controller 110 which adjusts an exposure condition in accordance with the aperture value controlled by the aperture controller 104.

18 Claims, 7 Drawing Sheets

(56) References Cited

FOREIGN PATENT DOCUMENTS

| | | |
|---|---|---|
| JP | 2000-165740 A | 6/2000 |
| JP | 3592147 B | 11/2004 |
| JP | 2006-157526 A | 6/2006 |
| JP | 2008-242182 A | 10/2008 |
| JP | 2009-042370 A | 2/2009 |

OTHER PUBLICATIONS

The above references were cited in a Sep. 22, 2011 Chinese Office Action, which is enclosed with an English Translation, that issued in Chinese Patent Application No. 201010140440.9.

\* cited by examiner

| R | G | R | G | R | G | R | G | } ROWS OF NORMAL IMAGING PIXELS
|---|---|---|---|---|---|---|---|
| G | B | G | B | G | B | G | B |
| R | G | R | G | R | G | R | G | } ROWS OF FIRST FOCUS DETECTION PIXELS
| S1 | B | S1 | B | S1 | B | S1 | B |
| R | G | R | G | R | G | R | G | } ROWS OF SECOND FOCUS DETECTION PIXELS
| S2 | B | S2 | B | S2 | B | S2 | B |
| R | G | R | G | R | G | R | G | } ROWS OF NORMAL IMAGING PIXELS
| G | B | G | B | G | B | G | B |

FIG. 5

# IMAGE PICKUP APPARATUS AND SIGNAL PROCESSOR

BACKGROUND OF THE INVENTION

1. Field of the Invention

The present invention relates to an image pickup apparatus such as a digital camera or a video camera, and more particularly to an image pickup apparatus which performs focus detection based on an output from an image pickup element.

2. Description of the Related Art

Japanese Patent No. 3592147 discloses an image pickup apparatus which performs focus detection using an image pickup element. The image pickup element of the image pickup apparatus includes a plurality of pairs of focus detection pixels which have optical characteristics different from those of other pixels in a part of pixels constituting the image pickup element, and performs the focus detection based on outputs of the focus detection pixels. In the image pickup apparatus, an image signal corresponding to a signal from the focus detection pixel is interpolated using an image signal of its peripheral pixel.

Japanese Examined Patent Publication No. 7-62731 discloses an automatic focus detection apparatus which detects the vignetting of an incident light beam to switch an aperture of an optical system. The automatic focus detection apparatus includes a first focus detector which receives a light beam having a first aperture value with respect to a pair of light beams passing through optical systems, which are different from each other, of an image pickup optical system from an object, and a second focus detector which receives a light beam having a second aperture value greater than the first aperture value. Further, the automatic focus detection apparatus includes an unbalance state detector which detects the vignetting in the light beam having the first aperture value, and is configured to switch between the first focus detector and the second focus detector to perform the focus detection in accordance with the detection result of the unbalance state detector.

Japanese Patent Laid-Open No. 2000-165740 discloses a camcorder which is configured so that a charge accumulation time is lengthened in order to prevent the deterioration of the play quality due to the shortness of the charge accumulation time of the image pickup element of the camcorder at the time of a video shooting. Japanese Patent Laid-Open No. 7-298002 discloses an image pickup apparatus which is configured to set the charge accumulation time of the image pickup element to a fixed value based on a blinking cycle of a flicker in order to prevent the deterioration of visibility due to the variation of the luminance in each frame of a video.

However, in the configuration disclosed in Japanese Patent No. 3592147, when an opening of the aperture controlling a light intensity at the time of shooting is equal to or less than an opening of a light shielding layer arranged at the front of the focus detection pixel, the vignetting is generated by the aperture in an incident light beam to the focus detection pixel. When an image signal outputted from the focus detection pixel is disordered by the vignetting, precise focus detection cannot be performed.

In the configuration disclosed in Japanese Examined Patent Publication No. 7-62731, when an opening of the aperture controlling the light intensity at the time of shooting is narrower than each of openings of the first and second focus detectors, the vignetting is generated in the incident light beam to each focus detector and precise focus detection cannot be performed.

In a case where the focus detections disclosed in Japanese Patent No. 3592147 and Japanese Examined Patent Publication No. 7-62731 are performed by a camcorder, when the aperture setting is controlled to be a small aperture side, the vignetting is generated in the focus detection pixel and precise focus detection cannot be performed. Further, in such focus detections, when the charge accumulation time of the image pickup element is set to a fixed value based on a blinking cycle of the flicker in shooting under the flicker illumination, the adjustment of an exposure amount is performed by the aperture setting and a signal gain adjustment. Therefore, when the object is bright, the aperture is easy to be stopped down. As a result, the vignetting is generated in the focus detection pixel and precise focus detection cannot be performed.

BRIEF SUMMARY OF THE INVENTION

The present invention provides an image pickup apparatus capable of performing focus detection by controlling an aperture of an image pickup optical system to prevent the generation of vignetting.

An image pickup apparatus as one aspect of the present invention comprises an image pickup element which includes a plurality of imaging pixels configured to perform a photoelectric conversion of an image formed by a light beam from an image pickup optical system and a plurality of focus detection pixels configured to perform a photoelectric conversion of an image formed by a divided light beam of the light beam from the image pickup optical system, a focus detector configured to perform a focus detection of the image pickup optical system based on an output of the focus detection pixels, an aperture controller configured to perform a control so that an aperture value of the image pickup optical system is equal to or less than a predetermined value when the focus detector perform the focus detection, and an exposure controller configured to adjust an exposure condition in accordance with the aperture value controlled by the aperture controller.

A signal processor as another aspect of the present invention is used for an image pickup apparatus including an image pickup element which includes a plurality of imaging pixels configured to perform a photoelectric conversion of an image formed by a light beam from an image pickup optical system and a plurality of focus detection pixels configured to perform a photoelectric conversion of an image formed by a divided light beam of the light beam from the image pickup optical system. The signal processor comprises a focus detector configured to perform a focus detection of the image pickup optical system based on an output of the focus detection pixels, an aperture controller configured to perform a control so that an aperture value of the image pickup optical system is equal to or less than a predetermined value when the focus detector perform the focus detection, and an exposure controller configured to adjust an exposure condition in accordance with the aperture value controlled by the aperture controller.

Further features and aspects of the present invention will become apparent from the following description of exemplary embodiments with reference to the attached drawings.

BRIEF DESCRIPTION OF THE DRAWINGS

FIG. 5 is one example of a pixel arrangement of an image pickup element where focus detection pixels are arranged at a part of rows of a pixel matrix in Embodiment 1.

DETAILED DESCRIPTION OF THE PREFERRED EMBODIMENTS

Figure 1:
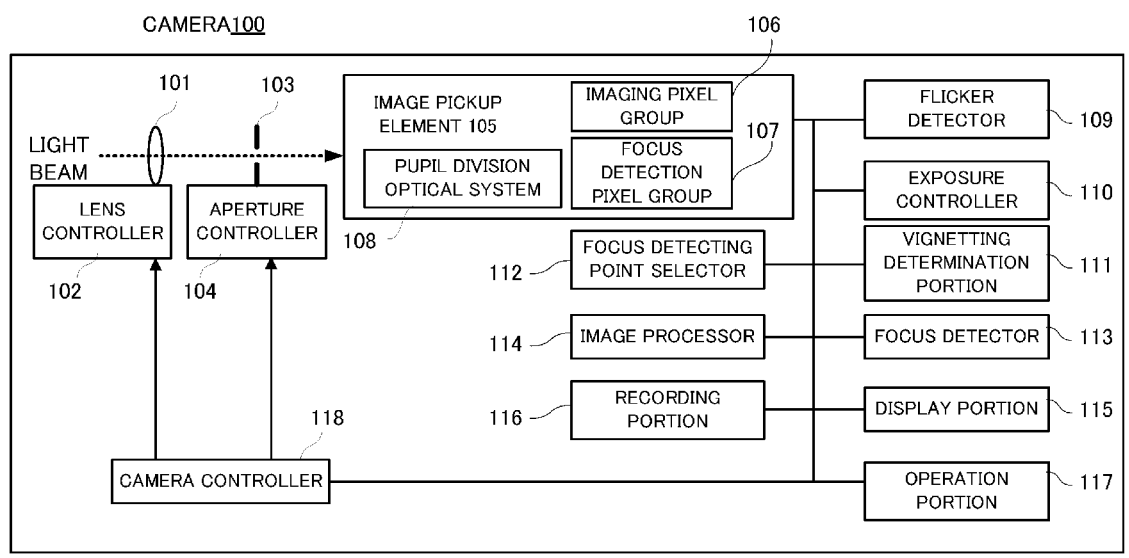
FIG. 1 is a configuration diagram of an image pickup apparatus in the present embodiment.

Exemplary embodiments of the present invention will be described below with reference to the accompanied drawings. In each of the drawings, the same elements will be denoted by the same reference numerals and the duplicate descriptions thereof will be omitted.

Embodiment 1

First, an image pickup apparatus in Embodiment 1 of the present invention will be described. FIG. 1 is a configuration diagram of an image pickup apparatus (a digital camera) in the present embodiment. A camera 100 (a digital camera) has a lens group 101 which forms an object image by a light beam from an object. In the present embodiment, the lens group 101 is integrally formed in the camera 100. The present embodiment is not limited to this, but the lens group 101 may also be separately configured so as to be detachable from the camera 100.

The lens group 101 includes a focus lens (not shown). A lens controller 102 controls a position of the focus lens. An aperture 103 constitutes a part of an image pickup optical system and adjusts an incident light intensity from the lens group 101. An aperture controller 104 (a controller) controls an amount of opening of the aperture 103. As described below, when focus detection is performed, the aperture controller 104 performs a control so that the aperture of the image pickup optical system opens equal to or more than a predetermined opening state, i.e. an aperture value (F value) of the image pickup optical system becomes a value equal to or less than a predetermined value (equal to or less than an aperture value for preventing vignetting).

In addition, the camera 100 is provided with an image pickup element 105 as a photoelectric conversion element. The image pickup element 105 is for example configured by a CMOS sensor which forms an object image on its light receiving surface by using the light beam from the lens group 101. The image pickup element 105 has an imaging pixel group 106 constituted by a plurality of imaging pixels, each of which includes a one-colored filter of R, G, and B and performs an photoelectrical conversion of the object image formed by the lens group 101. The imaging pixel group 106 outputs an image signal used for generating the object image. In addition, the image pickup element 105 has a plurality of focus detection pixel groups 107 which output a pair of image signals used for detecting a focus state (focus detection) of the lens group 101. The focus detection pixel group 107 includes a plurality of first and second focus detection pixels, each of which performs a photoelectric conversion of the light beam for which a pupil division has been performed by a pupil division optical system 108 described below. Thus, the image pickup element 105 includes the plurality of imaging pixels which perform a photoelectric conversion of the object image formed by the light beam from the image pickup optical system and the plurality of focus detection pixels which perform a photoelectric conversion of an image formed by a divided light beam of the light beam from the image pickup optical system.

FIG. 5 is one example of a pixel arrangement of the image pickup element where focus detection pixels are arranged at a part of rows of a pixel matrix. In FIG. 5, R, G, and B indicate red, green, and blue filters, respectively. Such a filter arrangement in an imaging pixel is well-known as Bayer arrangement. S1 and S2 are first and second focus detection pixels, respectively. These focus detection pixels have optical characteristics different from those of the imaging pixels.

Figure 6A:
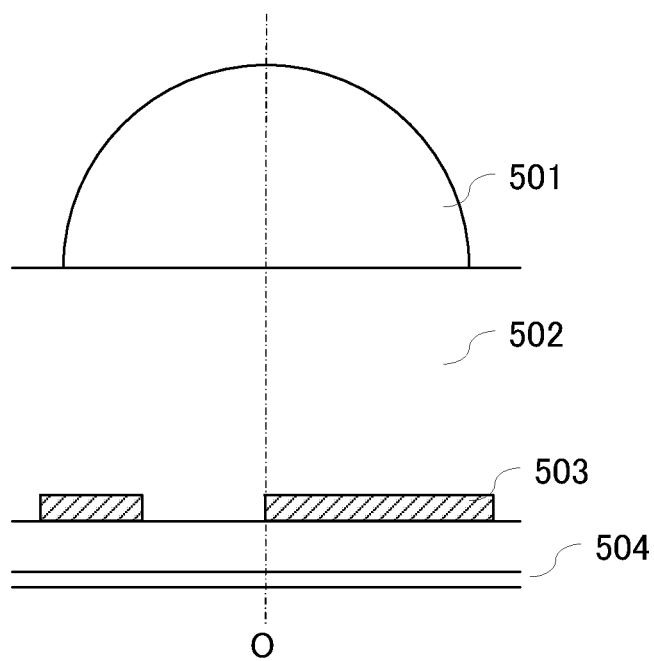
FIGS. 6A and 6B are configuration diagrams of a first focus detection pixel and a second focus detection pixel in FIG. 5, respectively.

FIG. 6A is a structure diagram of the first focus detection pixel S1 in FIG. 5. In FIG. 6A, a micro lens 501 is formed at a light incident side of the first focus detection pixel S1. Reference numeral 502 denotes a smoothing layer which constitutes a flat surface for forming the micro lens 501. Reference numeral 503 denotes a light shielding layer, and it has an aperture opening which is eccentric in one direction with reference to a center O of a photoelectric conversion area 504 of the first focus detection pixel S1.

Figure 6B:
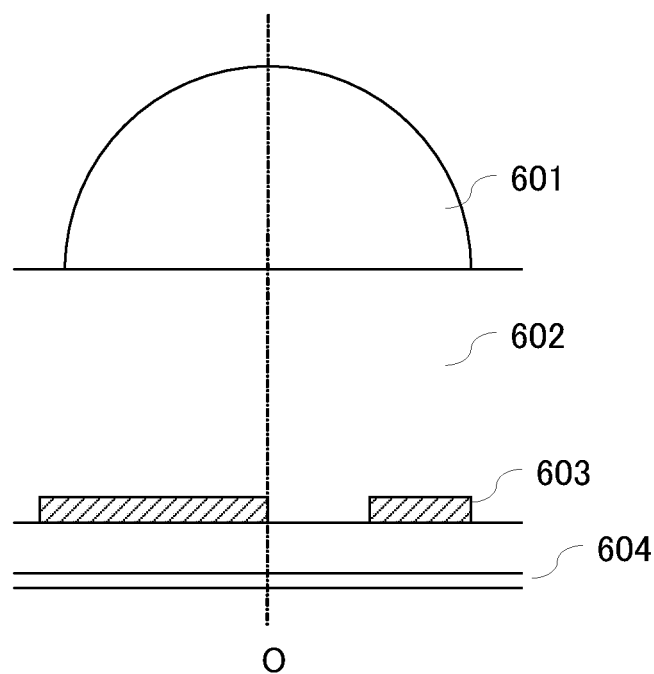

FIG. 6B is a structure diagram of the second focus detection pixel in FIG. 5. In FIG. 6B, a micro lens 601 is formed at a light incident side of the second focus detection pixel. Reference numeral 602 denotes a smoothing layer which constitutes a flat surface for forming the micro lens 601. Reference numeral 603 denotes a light shielding layer, and it has an aperture opening which is eccentric in a direction opposite to the light shielding layer 603 that is provided in the first focus detection pixel S1 with reference to a center O of a photoelectric conversion area 604 of the second focus detection pixel S2.

Thus, the light shielding layers 503 and 603 of the first and second focus detection pixels S1 and S2 have the aperture openings at positions symmetric to an optical axis of each micro lens. According to such a configuration, cases where the image pickup optical system is seen from the first focus detection pixel S1 and the second focus detection pixel S2 are equivalent to a state where the pupil of the image pickup optical system is symmetrically divided.

In FIG. 5, as the number of the image pickup elements is increased, two more approximated images are formed at a row including the first focus detection pixel S1 and a row including the second focus detection pixel S2. In a state where the image pickup optical system is focused on the object, the outputs (the image signals) obtained from the rows including the first focus detection pixel S1 and the second focus detection pixel S2 are coincident with each other. On the other hand, when the image pickup optical system is out of focus, a phase difference is generated between the image signals obtained from the first focus detection pixel S1 and the second focus detection pixel S2. Directions of the phase differences in a front focus state and a rear focus state are opposite to each other.

Figure 7A:
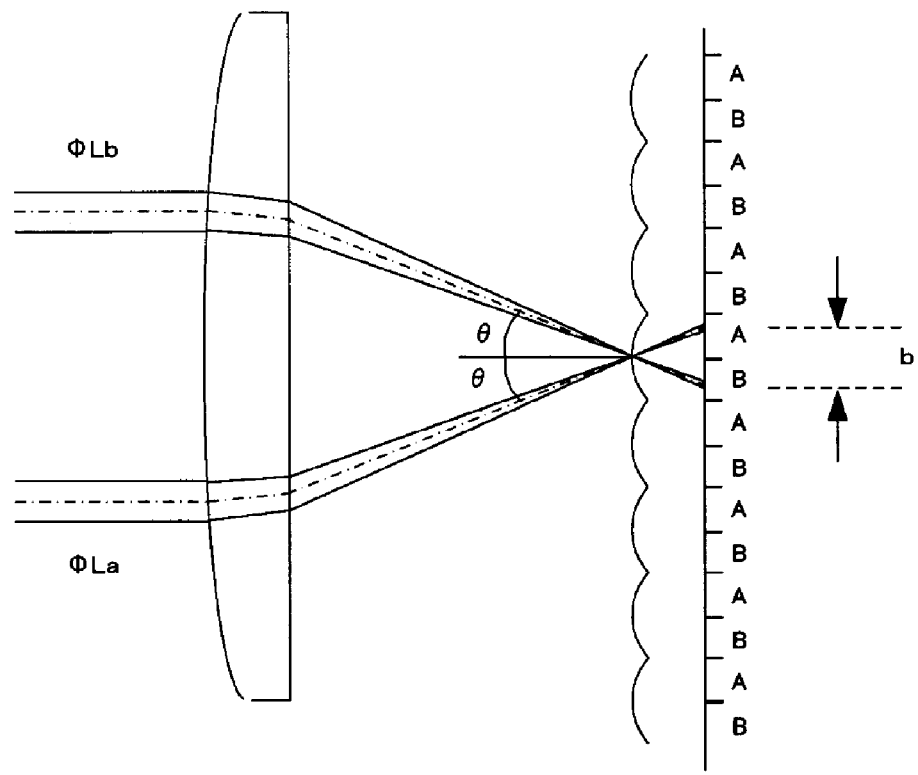
FIGS. 7A and 7B are illustrations showing phase differences of an image signal in an in-focus state and in a front focus state in the present embodiment, respectively.
Figure 7B:
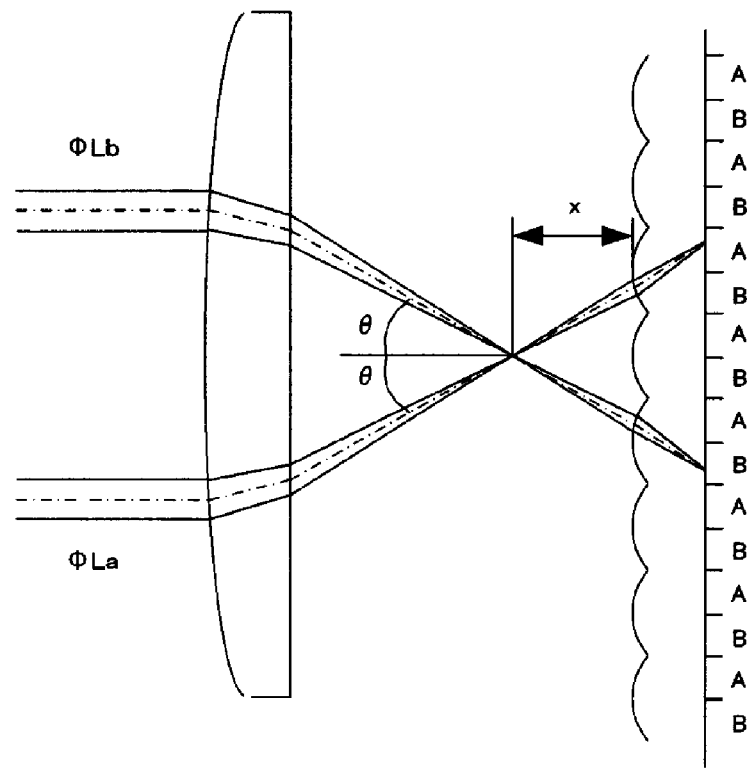

FIG. 7A is an illustration showing a phase difference of an image signal in an in-focus state, and FIG. 7B is an illustration showing a phase difference of an image signal in a front focus state. In FIGS. 7A and 7B, both the focus detection pixels S1 and S2 come close to each other and are indicated by A and B points, respectively. The imaging pixels are omitted in the drawings.

The light beam from a specific point on the object is divided into a light beam ΦLa which passes through a divided pupil corresponding to the focus detection pixel A to enter the focus detection pixel A and a light beam ΦLb which passes through a divided pupil corresponding to the focus detection pixel B to enter the focus detection pixel B. These two light beams are emitted from an identical point on the object. Therefore, in the case where the image pickup optical system is in focus (the in-focus state) as shown in FIG. 7A, the two light beams pass through the identical micro lens to reach one point on the image pickup element. Therefore, the image signals obtained from the row including the first focus detection pixel A (S1) and the row including the second focus detection pixel B (S2) are coincident with each other.

On the other hand, in the case where the image pickup optical system is out of focus (the front focus state) as shown in FIG. 7B, the reaching positions of both the light beams ΦLa and ΦLb are displaced by a change of an incident angle of the light beams ΦLa and ΦLb with respect to the micro lens. Therefore, a phase difference is generated between the image signals obtained from the row including the first focus detection pixel A (S1) and the row including the second focus detection pixel B (S2).

In the present embodiment, a first phase difference sensor is constituted by the plurality of first focus detection pixels S1, and a second phase difference sensor is constituted by the plurality of second focus detection pixels S2. The first phase difference sensor outputs one of a pair of image signals, and the second phase difference sensor outputs the other of the pair of image signals.

In FIG. 1, in addition, the image pickup element 105 is provided with a pupil division optical system 108 which makes the light beams for which a pupil division has been performed of the light beams from the lens group 101 enter the first and second phase difference sensors.

Figure 2:
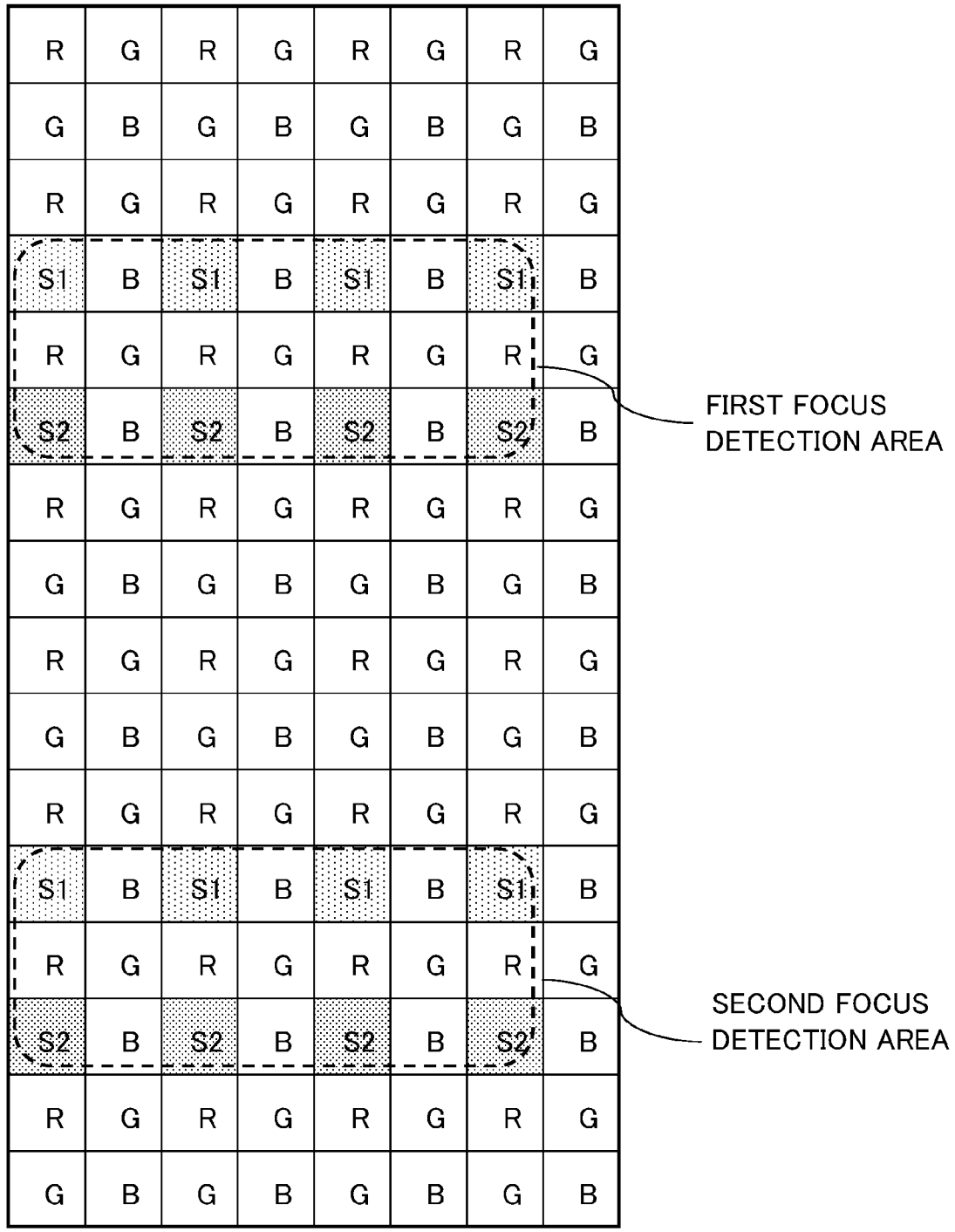
FIG. 2 is an arrangement diagram of imaging pixel groups and focus detection pixel groups in the present embodiment.

A pixel arrangement of the image pickup element 105 used in the present embodiment is shown in FIG. 2. In FIG. 2, the first and second focus detection pixels in the focus detection pixel group 107 are indicated as S1 and S2, respectively. The structures of the first and second focus detection pixels S1 and S2 are the same as those shown in FIGS. 6A and 6B, respectively. In other words, the light shielding layers 503 and 603 which are provided in the first and second focus detection pixels S1 and S2 are provided with aperture openings at positions symmetric to the optical axis of the micro lenses 501 and 601 as a pupil division optical system 108, respectively.

In FIG. 2, a pixel row where the first focus detection pixels S1 are discretely inserted constitutes the first phase difference sensor. A pixel row where the second focus detection pixels S2 are discretely inserted, which is arranged at a remove of a predetermined interval with respect to the first phase difference sensor (an interval by one pixel in FIG. 2), constitutes the second phase difference sensor. One focus detection pixel group including these first and second phase difference sensors forms one focus detection area. In FIG. 2, a first focus detection area and a second focus detection area are arranged at the upper and lower portion of the image pickup element 105, respectively.

In FIG. 1, a flicker detector 109 detects whether or not the flicker is generated in illumination light based on an image signal outputted from an imaging pixel group 106. An exposure controller 110 adjusts an exposure condition in accordance with an aperture value controlled by an aperture controller 104. Specifically, the exposure controller 110 calculates an appropriate balance of an aperture opening state, a charge accumulation time, and an exposure sensitivity of the image pickup element 105 so that an image signal of an appropriate luminance level can be obtained from the image pickup element 105 to set these control values. The exposure conditions adjusted by the exposure controller 110 are for example the charge accumulation time and the exposure sensitivity, but the present embodiment is not limited to this and other exposure conditions can also be adjusted.

A vignetting determination portion 111 (a determination portion) determines whether or not vignetting is generated in a focus detection pixel based on an image height of the focus detection pixel and optical information of the image pickup optical system. The optical information is for example a focal length, a focal position, and an aperture value before the focus detection of the image pickup optical system. However, the optical information of the present embodiment is not limited to these values, and other optical information may also be used. Specifically, the vignetting determination portion 111 determines whether or not the vignetting is generated in a light beam entering the focus detection pixel group 107 included in a targeted area of the focus detection, based on the image height of the focus detection pixel, the focal length, the focal position, and the current aperture setting (an aperture value). The image height of the focus detection pixel is an image height of an area most distant from the optical axis center of one or more focus detection areas for which focus detection is performed by a focus detector 113 described below. In other words, the image height is the highest image height of the plurality of focus detection pixels used for performing the focus detection.

The vignetting determination portion 111 also functions as a calculator which calculates a new aperture value (an opening state) of the aperture 103 capable of preventing the generation of the vignetting based on the image height, the focal length, and the focal position when it determines that the vignetting is to be generated. Thus, the vignetting determination portion 111 as a calculator calculates an aperture value for reducing the vignetting as compared with a predetermined value, based on an output of the vignetting determination portion 111 as a determination portion. The aperture controller 104 sets the aperture value of the aperture 103 based on the output of the vignetting determination portion 111.

Whether or not the vignetting is generated is uniquely determined by optical characteristics of the lens group 101, the aperture value of the aperture 103, the apertures 503 and 603 in the focus detection pixel group 107, and the image height of the focus detection pixel group 107. In the embodiment, the apertures 503 and 603 in the focus detection pixel group 107 are fixed values. Therefore, a new aperture value of the aperture 103 is previously stored in a memory area (not shown) as a matrix table of the image height, the focal length, and the focal position to be read out if necessary. The new aperture value may also be stored in the memory area as an expression with variables relating to the image height, the focal length, and the focal position.

A focus detection point selector 112 selects one used for the focus detection out of the plurality of focus detection pixel groups 107 on the image pickup element 105. The camera 100 has two kinds of focus detection modes of a "focus detection point manual select mode" in which a specific focus detection pixel group 107 is selected and a "a focus detection point automatic select mode" in which a focus detection is performed by the plurality of focus detection pixel groups 107 selected by a focus detector 113 described below. The focus detection point selector 112 selects a pixel group for which the focus detection is performed in accordance with the focus detection mode set by the operation input by an operation portion 117.

The camera 100 has a focus detector 113 which obtains a phase difference of a pair of image signals outputted from the first and second phase difference sensors, i.e. the focus detection pixel group 107, in each focus detection area using a correlation calculation. Thus, the focus detector 113 performs a focus detection based on the outputs of the first and second focus detection pixels S1 and S2. In the embodiment, "a pair of image signals outputted from the first and second phase difference sensors" is basically a pair of image signals generated only by output signals of the first and second focus detection pixels S1 and S2. However, the pair of image signals may also be generated by output signals of the entire focus detection pixel group.

Further, the focus detector 113 calculates a defocus amount which indicates a focal state of the lens group 101 with respect to the object whose image is formed in the focus detection area based on the phase difference.

In the present embodiment, a case where the focus detector 113 calculates a defocus amount is described, but the focus detector 113 can also be configured to calculate the phase difference of the image signal so that the defocus amount is calculated based on the phase difference by a camera controller 118 described below. Further, in the present embodiment, the defocus amount is described as a focal state, but the phase difference may also be the focal state. Thus, the focus detector 113 independently performs focus detection (calculation of the defocus amount) in each focus detection area.

The camera 100 includes an image processor 114 which performs an image processing such as gamma correction, white balance adjustment, resampling for display, and image compression coding with respect to the image signal outputted from the imaging pixel group 106. Further, the camera 100 includes a display portion 115 which displays image data (live view image data or still image data) outputted from the image processor 114 and a recording portion 116 which records the image data in a recoding medium such as a semiconductor memory or an optical disc. The camera 100 also includes an operation portion 117 which receives an operation input by a user and a camera controller 118 which controls the entire camera 100.

The camera controller 118 calculates a driving amount of the focus lens for obtaining the in-focus state based on the defocus amount obtained from the focus detector 113. The calculated driving amount is outputted to the lens controller 102, and the lens controller 102 moves the focus lens based on the driving amount. Thus, the automatic focusing (AF) is performed and the in-focus state of the lens group 101 can be obtained.

In the camera 100 of the present embodiment, it is preferable that each of the focus detector 113, the aperture controller 104, the exposure controller 110, and the like is provided as a signal processor which is constituted by one chip or a plurality of chips.

Figure 3:
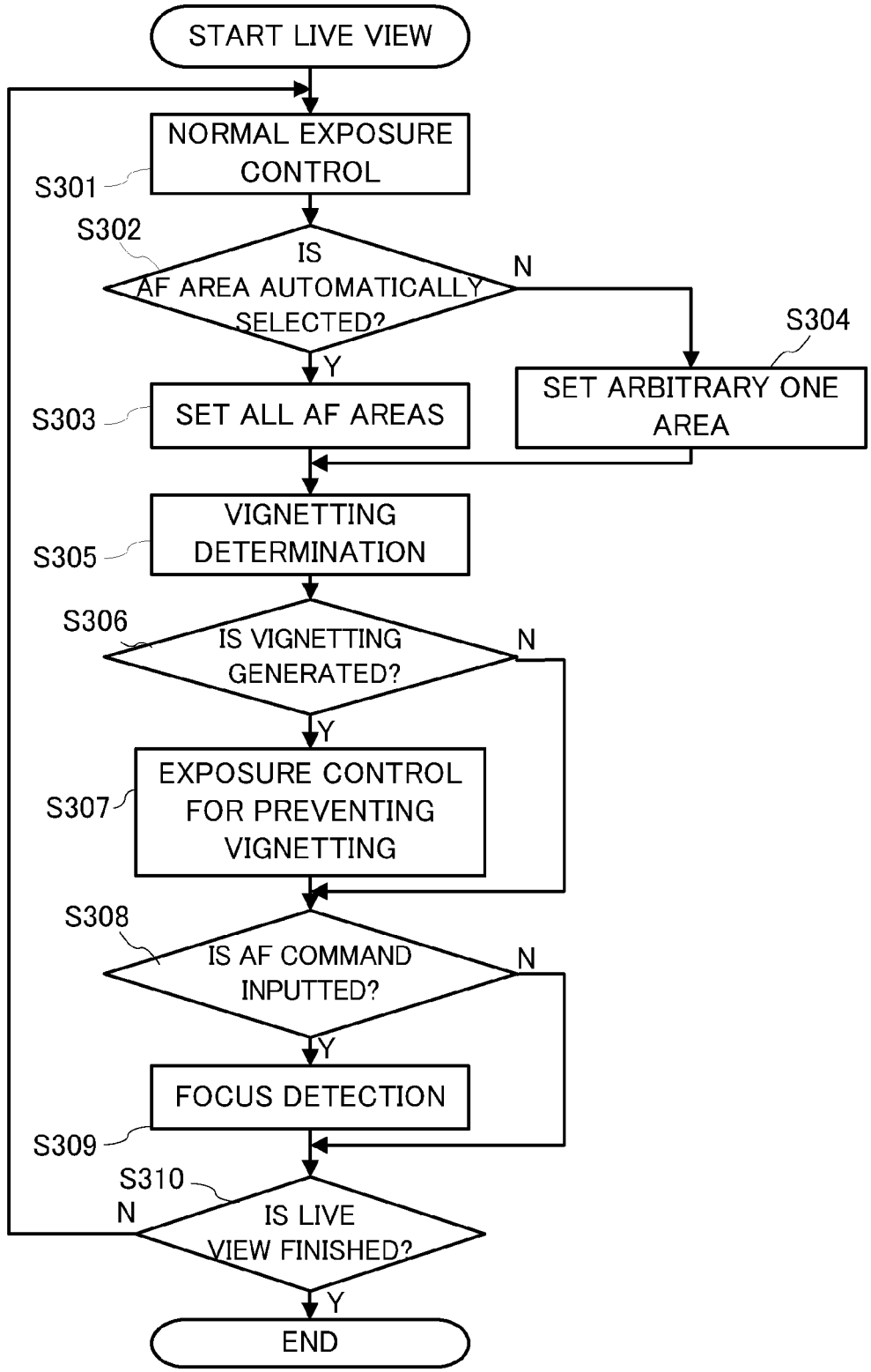
FIG. 3 is an operation flow of an image pickup apparatus at the time of performing focus detection in Embodiment 1.

Next, an operation of the camera 100 at the time of performing the focus detection in the present embodiment will be described. FIG. 3 is an operation flow of the camera 100 (mainly the camera controller 118) at the time of performing the focus detection in the present embodiment. The operation is performed in accordance with a computer program stored in a memory (not shown) in the camera controller 118. Each part of the camera 100 is operated based on an instruction by the camera controller 118. The camera controller 118 starts with its operation in Step S301 in accordance with an input of a live view start signal from the operation portion 117 (for example, a signal outputted by the press of a button specifically provided).

In Step S301, the exposure controller 110 determines an exposure condition previously determined in accordance with an exposure amount (specifically, an aperture value of the aperture 103, charge accumulation time of the image pickup element 105, an exposure sensitivity of the image pickup element 105, or the like). Then, the exposure controller 110 changes the aperture value of the aperture 103 (opening state) via the camera controller 118 and the aperture controller 104 (normal exposure control). After changing the aperture value, the operation by the camera controller 118 proceeds to Step S302.

In Step S302, the camera controller 118 determines whether or not the automatic select mode is selected out of select modes of selecting the focus detection area which is selected by a focus detection mode signal from the operation portion 117 (for example, a signal outputted by the press of a button specifically provided). As select modes of selecting the focus detection area, there are a "manual select mode of a focus detection point" in which a specific focus detection pixel group 107 is selected and a "automatic select mode of a focus detection point" in which a focus detection is performed by the plurality of focus detection pixel groups 107 selected by the focus detection point selector 112. When the automatic select mode of the focus detection point is selected, the operation of the camera controller 118 proceeds to Step S303. On the other hand, when the manual select mode of the focus detection point is selected, the operation proceeds to Step S304.

In Step S303, the focus detector 113 performs focus detection in all the focus detection areas (the focus detection pixel groups 107). In other words, the focus detector 113 determines the focus detection area finally to be focused based on a result of the focus detection in all the focus detection areas. Then, the operation of the camera controller 118 proceeds to Step S305. On the other hand, in Step S304, the focus detector 113 determines one arbitrary area set by a user operation from the operation portion 117 to perform focus detection for the area. Then, the operation of the camera controller 118 proceeds to Step S305.

In Step S305, the vignetting determination portion 111 determines the highest image height in the focus detection area. For example, if the focus detection point automatic select mode is selected, the highest image height in the plurality of focus detection pixel group 107 (focus detection area) used for the focus detection is adopted. On the other hand, if the focus detection point manual select mode is selected, an image height in a selected specific focus detection pixel group 107 (focus detection area) is adopted.

The vignetting determination portion 111 determines whether or not the vignetting is generated with respect to the light beam to the focus detection pixel group 107 included in the target area of the focus detection, based on the highest image height in the focus detection area, the focal length, the focal position, and the current aperture value of the aperture 103. Subsequently, when it is determined that the vignetting is generated in a conditional branch of Step S306, the operation of the camera controller 118 proceeds to Step S307. On the other hand, when it is determined that the vignetting is not generated in Step S306, the operation proceeds to Step S308.

In Step S307, the vignetting determination portion 111 determines an aperture value capable of preventing the generation of the vignetting based on the highest image height in the focus detection area, the focal length, the focal position, and the current aperture setting. The aperture value (the aperture value for preventing the generation of the vignetting) determined by the vignetting determination portion 111 is communicated to the aperture controller 104 and the exposure controller 110. The aperture controller 104 which has received the aperture value for preventing the generation of the vignetting performs a control so that the aperture value of the aperture 103 (opening state) becomes the aperture value for preventing the generation of the vignetting. Specifically, the aperture controller 104 performs a control so that the aperture 103 is open equal to or more than a predetermined open state, i.e. the aperture value of the aperture 103 becomes equal to or less than a predetermined value (equal to or less than the aperture value for preventing the generation of the vignetting).

On the other hand, the exposure condition changes in accordance with the change of the aperture value of the aperture 103. Therefore, the exposure controller 110 receives the aperture value for preventing the generation of the vignetting from the vignetting determination portion 111 to redefine the exposure conditions such as charge accumulation time of the image pickup element 105 and exposure sensitivity of the image pickup element 105. After the exposure conditions are redefined, the operation of the camera controller 118 proceeds to Step S308.

In Step S308, the camera controller 118 determines whether or not an AF command signal (for example, a signal outputted by a halfway press operation of a release button) is inputted from the operation portion 117. When the AF command signal is inputted, the operation of the camera 118 proceeds to Step S309. On the other hand, when the AF command signal is not inputted, the operation proceeds to Step S310.

In Step S309, the focus detector 113 performs focus detection with respect to a predetermined focus detection area determined in Step S303 or Step S304. After the focus detection is performed by the focus detector 113, the operation of the camera controller 118 proceeds to Step S310.

In Step S310, the camera controller 118 determines whether or not a live view end signal from the operation portion 117 (for example, a signal outputted by the press of a button specifically provided) is inputted. When the live view end signal is inputted, the camera controller 118 finishes the live view. When the live view end signal is not inputted, the operation of the camera controller 118 returns to Step S301.

According to the operation flow as described above, regardless of the aperture value set at the time of exposure control, the camera 100 can perform the focus detection without being influenced by the vignetting.

Embodiment 2

Figure 4:
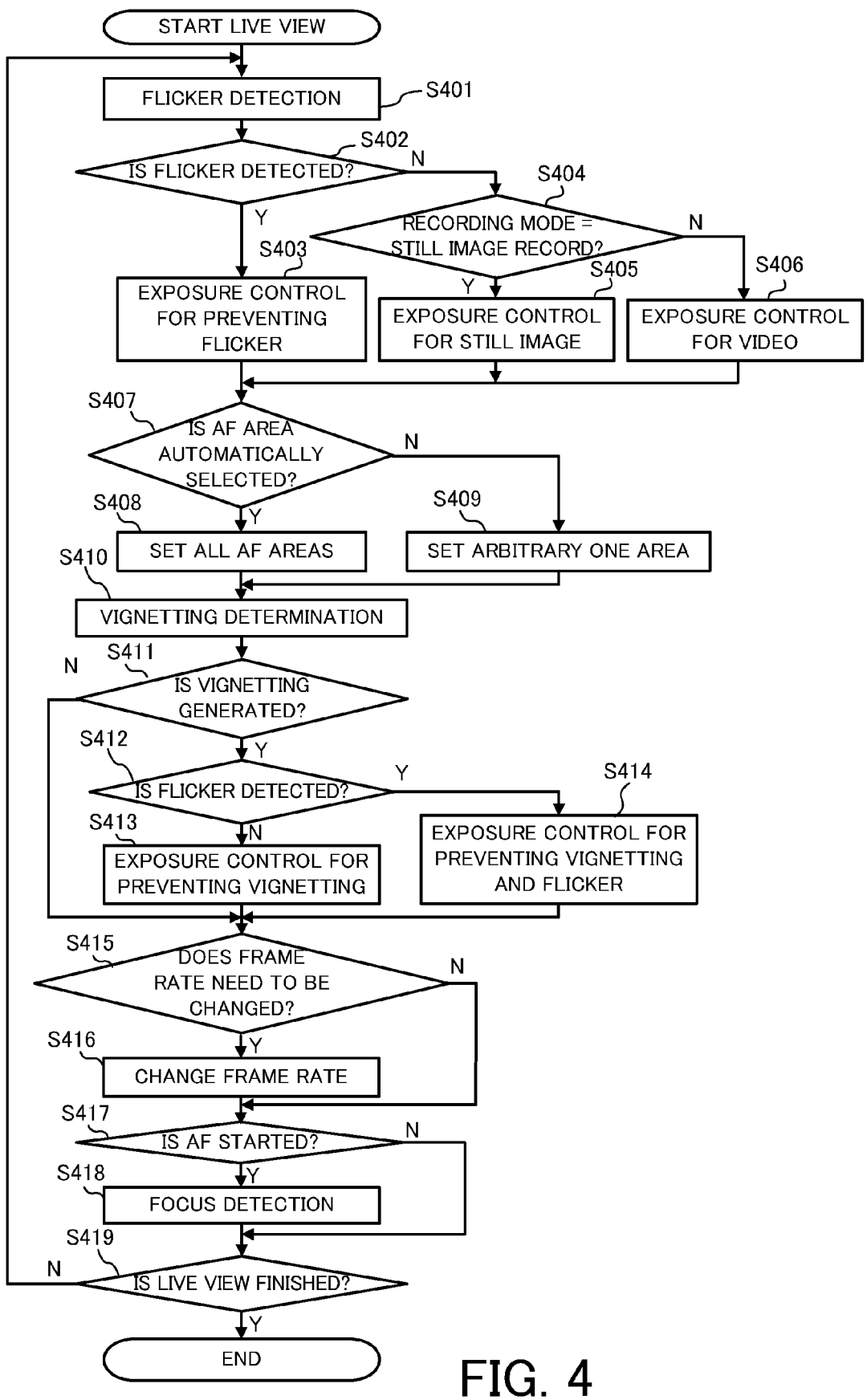
FIG. 4 is an operation flow of an image pickup apparatus at the time of performing focus detection in Embodiment 2.

Next, Embodiment 2 of the present invention will be described. FIG. 4 is an operation flow of the camera 100 (mainly a camera controller 118) in the present embodiment.

In Embodiment 1, the vignetting of the light beam which causes an impediment for the focus detection is determined by the aperture control along with the exposure control after a normal exposure control is performed with the start of the live view operation. When the vignetting is generated, the aperture is open (the aperture value is decreased) so as not to generate the vignetting to control the exposure again. On the other hand, in the present embodiment, an operation flow capable of obtaining an effect of the present invention even when the exposure is controlled so as to be in a small aperture priority in recording a video or the exposure control preventing the flicker of illumination light is performed will be described. The operation flow shown in FIG. 4 is, similarly to the case of Embodiment 1, performed in accordance with a computer program stored in a memory (not shown) in the camera controller 118. Each part of the camera 100 works based on an instruction of the camera controller 118.

The camera controller 118 starts its operation with Step S401 due to the input of the live view start signal from the operation portion 117 (for example, a signal outputted by the press of a button specifically provided). In Step S401, the flicker detector 109 detects a flicker generation state in the illumination light to an object based on an image signal outputted from the imaging pixel group 106 of the image pickup element 105 to communicate the detection result to the exposure controller 110. After the detection result is communicated by the flicker detector 109, the operation of the camera controller 118 proceeds to a determination process in Step S402. In Step S402, when the flicker is detected by the flicker detector 109, the operation of the camera controller 118 proceeds to Step S403. On the other hand, when the flicker is not detected by the flicker detector 109, the operation proceeds to Step S404.

In Step S403, the exposure controller 110 sets a charge accumulation time so as to prevent the generation of the flicker in image data. The charge accumulation time is set at the time based on a flicker cycle ($1/100$ second in an area where a commercial power frequency is 50 Hz, or $1/120$ second in an area where the commercial power frequency is 60 Hz) or at the time of its integral multiple. In addition, the exposure controller 110 determines the aperture value (opening state) for obtaining an appropriate luminance level and the exposure sensitivity of the image pickup element 105 based on the set charge accumulation time and the luminance level of the imaging pixel group 106 to set these exposure conditions. After the exposure conditions are set, the operation of the camera controller 118 proceeds to Step S407.

In Step S404, the camera controller 118 determines whether or not a still image mode is selected out of recording classifications to be selected by recording modes from the operation portion 117 (for example, a signal outputted by the press of a button specifically provided). The recording modes include a "still image mode" in which one image is recorded at the operation input timing and a "video mode" in which a video recording starts or ends at the operation input timing. When the still image mode is selected, the operation of the camera controller 118 proceeds to Step S405. On the other hand, when the video mode is selected, the operation of the camera controller 118 proceeds to Step S406.

In Step S405, the exposure controller 110 determines exposure conditions for the still image which are previously defined in accordance with an exposure amount (specifically, the aperture value of the aperture 103, the charge accumulation time of the image pickup element 105, the exposure sensitivity of the image pickup element 105, or the like). The exposure controller 110 changes the aperture value (opening state) of the aperture 103 via the camera controller 118 and the aperture controller 104. After the aperture value is changed, the operation of the camera controller 118 proceeds to Step S407.

In Step S406, the exposure controller 110 determines exposure conditions for the video which are previously defined in accordance with an exposure amount (specifically, the aperture value of the aperture 103, the charge accumulation time of the image pickup element 105, the exposure sensitivity of the image pickup element 105, or the like). The exposure controller 110 changes the aperture value (opening state) of the aperture 103 via the camera controller 118 and the aperture controller 104.

The camera 100 of the present embodiment has a selector which selects one of an aperture value giving priority to depth of field and an aperture value for a video. In an exposure condition for the video, the aperture value of the aperture 103 is determined by giving priority to a small aperture side. In other words, the selector selects the aperture value giving priority to depth of field. Therefore, the depth of field is deepened and the defocusing with respect to the object moving in an optical axis direction can be prevented. On the other hand, the selector selects the aperture value for focus detection when the focus detection described below is performed. The operation of the camera controller 118 proceeds to Step S407 after the selector changes the aperture value.

In Step S407, the camera controller 118 determines whether or not an automatic select mode of a focus detection point is selected out of select modes for the focus detection area (the focus detection pixel group 107). The select mode for the focus detection area is selected based on a focus detection mode signal from the operation portion 117 (for example, a signal outputted by the press of a button specifically provided). The select modes for the focus detection area include a "manual select mode of a focus detection point" in which a specific focus detection pixel group 107 is selected and an "automatic select mode of a focus detection point" in which focus detection is performed in a plurality of focus detection pixel groups 107 selected by a focus detection point select portion 112. When the automatic select mode of the focus detection point is selected, the operation of the camera controller 118 proceeds to Step S408. On the other hand, when the manual select mode of the focus detection point is selected, the operation of the camera controller 118 proceeds to Step S409.

In Step S408, the focus detector 113 performs the focus detection in all the focus detection areas. The focus detector 113 determines a focus detection area for which the focusing is finally performed based on the detection result. Subsequently, the operation of the camera controller 118 proceeds to Step S410. In Step S409, the focus detector 113 performs the focus detection with respect to one arbitrary area specified by a user operation via the operation portion 117. Subsequently, the operation of the camera controller 118 proceeds to Step S410.

In Step S410, the vignetting determination portion 111 determines the highest image height in the focus detection area. For example, in the automatic select mode of the focus detection point, the highest image height in the plurality of focus detection pixel groups 107 used for the focus detection is adopted. On the other hand, in the manual select mode of the focus detection point, the image height of the selected specific focus detection pixel group 107 is adopted. After the image height is determined, the vignetting determination portion 111 determines whether or not the vignetting is generated with respect to a light beam to the focus detection pixel group 107 included in a target area for the focus detection, based on the highest image height in the focus detection area, the focal length, the focal position, and the current aperture value. Subsequently, when it is determined that the vignetting is generated in a conditional branch of Step S411, the camera controller 118 proceeds to Step S412. On the other hand, when it is determined that the vignetting is not generated in Step S411, the camera controller 118 proceeds to Step S415.

In Step S412, the camera controller 118 switches its operation depending on whether or not the flicker detector 109 detects the flicker in Step S401. The operation of the camera controller 118 proceeds to Step S413 when the flicker is not detected in Step S401. On the other hand, the operation of the camera controller 118 proceeds to Step S414 when the flicker is detected in Step S401.

In Step S413, the vignetting determination portion 111 determines an aperture value capable of preventing the generation of the vignetting based on the highest image height in the focus detection area, the focal length, the focal position, and the current aperture setting. The aperture value (the aperture value for preventing the generation of the vignetting) determined by the vignetting determination portion 111 is communicated to the aperture controller 104 and the exposure controller 110. The aperture controller 104 receives the aperture value for preventing the vignetting to perform a control so that the aperture value (opening state) of the aperture 103 becomes the aperture value for preventing the vignetting. Specifically, the aperture controller 104 performs a control so that the aperture 103 opens more than a predetermined opening state, i.e. an aperture value of the aperture 103 becomes a value equal to or less than a predetermined value (equal to or less than an aperture value for preventing the vignetting).

On the other hand, the exposure condition changes in accordance with the change of the aperture value by the aperture controller 104. Therefore, the exposure controller 110 receives the aperture value for preventing the vignetting to redefine the exposure conditions such as a charge accumulation time of the image pickup element 105 and an exposure sensitivity of the image pickup element 105. After the exposure controller 110 redefines the exposure conditions, the operation of the camera controller 118 proceeds to Step S415.

In Step S414, the vignetting determination portion 111 and the aperture controller 104 perform a processing and a control similar to those of Step S413 described above. The exposure controller 110 receives the aperture value for preventing the vignetting to redefine the exposure conditions such as a charge accumulation time of the image pickup element 105 and an exposure sensitivity of the image pickup element 105. In this case, the exposure controller 110 sets the charge accumulation time so as to prevent the flicker. The charge accumulation time is set at the time based on a flicker cycle ($\frac{1}{100}$ second in an area where a commercial power frequency is 50 Hz, or $\frac{1}{120}$ second in an area where the commercial power frequency is 60 Hz) or at the time of its integral multiple. After the exposure controller 110 sets the charge accumulation time, the operation of the camera controller 118 proceeds to Step S415.

In Step S415, along with the exposure control in Step S413 or Step S414, the camera controller 118 compares a charge accumulation interval of the image pickup element 105 based on a frame rate with the charge accumulation time determined by the exposure control. The camera controller 118 determines whether or not the frame rate needs to be changed based on the comparison result.

The operation is performed so that a settable range of the charge accumulation time of the image pickup element 105 is enlarged even when the frame rate is sacrificed to appropriately control an exposure amount of the image pickup element 105 to appropriately perform the focus detection, and so that the live view can be displayed with an appropriate luminance. The frame rate of the charge accumulation is switched by a switch (not shown). When the charge accumulation time is longer than the charge accumulation interval, the camera controller 118 changes the frame rate from an initial setting so that the charge accumulation can be completed in the determined charge accumulation time. Therefore, the operation of the camera controller 118 proceeds to Step S416.

On the other hand, when the charge accumulation interval is longer than the charge accumulation time in a condition where the frame rate is in an initial setting, the camera controller 118 does not need to change the frame rate and the operation of the camera controller 118 proceeds to Step S417. On the other hand, when the frame rate is already changed from the initial setting and the charge accumulation time is longer than the charge accumulation interval, the camera controller 118 needs to change the frame rate again so that the charge accumulation can be performed in the determined charge accumulation time. Therefore, the operation of the camera controller 118 proceeds to Step S416.

When the frame rate is already changed from the initial setting and the charge accumulation interval is longer than the charge accumulation time, the camera controller 118 compares the charge accumulation interval based on the initial setting of the frame rate with the charge accumulation time. The camera controller 118 determines whether or not the frame rate can be returned to the initial setting based on the comparison result. When the frame rate can be returned to the initial setting, the operation of the camera controller 118 proceeds to Step S416 to change the frame rate to the initial setting. On the other hand, when the frame rate cannot be returned to the initial value, the camera controller 118 does not need to change the frame rate and the operation proceeds to Step S417.

In Step S416, a frame rate controller (not shown) redefines the charge accumulation interval based on the charge accumulation time. After the charge accumulation interval is redefined, the camera controller 118 proceeds to Step S417.

In Step S417, the camera controller 118 determines whether or not the AF command signal from the operation portion 117 (for example, a signal outputted by the halfway press operation of a release button) is inputted. When the AF command signal is inputted, the operation of the camera controller 118 proceeds to Step S418. On the other hand, the AF command signal is not inputted, the operation of the camera controller 118 proceeds to Step S419.

In Step S418, the focus detector 113 performs the focus detection with respect to a predetermined focus detection area determined in Step S408 or Step S409. After the focus detection is performed by the focus detector 113, the operation of the camera controller 118 proceeds to Step S419.

In Step S419, the camera controller 118 determines whether or not the live view end signal from the operation portion 117 (for example, a signal outputted by the press of a button specifically provided) is inputted. When the live view end signal is inputted, the live view is finished. On the other hand, when the live view end signal is not inputted, the operation of the camera controller 118 returns to Step S401.

According to the above operation, even when the exposure is controlled so as to give priority to a small aperture in recording a video or the exposure control which prevents the flicker of the illumination light is performed, precise focus detection can be performed.

In the configuration of each of the above embodiments, a plurality of focus detection areas are provided, but the present invention is not limited to this. One focus detection area configured by a part of a focus detection pixel may also be movable in a distribution range of the focus detection pixel by the operation input by a user. In each of the above embodiments, focus detection when a recording mode is a video recording is performed in accordance with the input of the AF command signal, but the present invention is not limited to this. The focus detection may also be performed at a predetermined time interval or at all times.

As described above, in each of the above embodiments, the aperture value in which the vignetting is less than a predetermined amount is calculated to redefine exposure conditions in accordance with lens information and the control state of the aperture, image height information of the focus detection area, or the like. Therefore, regardless of the aperture setting for shooting, the state where focus detection is impossible can be prevented. Therefore, according to the present embodiment, an image pickup apparatus capable of performing the focus detection by controlling the aperture of the image pickup optical system to prevent the generation of the vignetting can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-065435, filed on Mar. 18, 2009, which is hereby incorporated by reference herein in its entirety.

What is claimed is:

1. An image pickup apparatus comprising:
   an image pickup element which includes a plurality of imaging pixels configured to perform a photoelectric conversion of an image formed by a light beam from an image pickup optical system and a plurality of focus detection pixels configured to perform a photoelectric conversion of an image formed by a divided light beam of the light beam from the image pickup optical system;
   a focus detector configured to perform a focus detection of the image pickup optical system based on an output of the focus detection pixels;
   a vignetting determination portion configured to determine whether or not vignetting is generated in the focus detection pixels;
   an aperture controller configured to perform a restriction so that an aperture value of the image pickup optical system is equal to or less than a predetermined value in a first mode where the focus detector performs the focus detection and if the vignetting determination portion determines that vignetting is generated in the focus detection pixels, the restriction being not performed in a second mode that is different from the first mode; and
   an exposure controller configured to adjust an exposure condition in accordance with the aperture value restricted by the aperture controller.

2. An image pickup apparatus according to claim 1, wherein the exposure condition includes a charge accumulation time and an exposure sensitivity.

3. An image pickup apparatus according to claim 1, further comprising:
   the vignetting determination portion is configured to determine whether or not vignetting is generated in the focus detection pixels based on an image height of the focus detection pixels and optical information of the image pickup optical system; and
   a calculator configured to calculate the aperture value to reduce the vignetting to less than a predetermined value based on an output of the determination portion,
   wherein the aperture controller is configured to set the aperture value based on an output of the calculator in the restriction.

4. An image pickup apparatus according to claim 3, wherein the optical information includes a focal length, a focal position, and an aperture value before focus detection of the image pickup optical system.

5. An image pickup apparatus according to claim 3, wherein the calculator calculates the aperture value based on the highest image height of image heights of the plurality of focus detection pixels used for the focus detection.

6. An image pickup apparatus according to claim 3, further comprising a selector configured to select an aperture value for the focus detection out of an aperture value giving priority to depth of field and an aperture value for the focus detection in the first mode,
   wherein the aperture controller sets the aperture value based on an output of the selector.

7. An image pickup apparatus according to claim 1, further comprising:
- a flicker detector configured to detect a flicker of illumination light; and
- a switch configured to switch a frame rate of a charge accumulation based on outputs of the flicker detector and the exposure controller.

8. A signal processor used for an image pickup apparatus including an image pickup element which includes a plurality of imaging pixels configured to perform a photoelectric conversion of an image formed by a light beam from an image pickup optical system and a plurality of focus detection pixels configured to perform a photoelectric conversion of an image formed by a divided light beam of the light beam from the image pickup optical system, the signal processor comprising:
- a focus detector configured to perform a focus detection of the image pickup optical system based on an output of the focus detection pixels;
- a vignetting determination portion configured to determine whether or not vignetting is generated in the focus detection pixels;
- an aperture controller configured to perform a restriction so that an aperture value of the image pickup optical system is equal to or less than a predetermined value in a first mode where the focus detector performs the focus detection and if the vignetting determination portion determines that vignetting is generated in the focus detection pixels, the restriction being not performed in a second mode that is different from the first mode; and
- an exposure controller configured to adjust an exposure condition in accordance with the aperture value restricted by the aperture controller.

9. An image pickup apparatus comprising: an image pickup element which outputs an image signal for recording image, and outputs a focus signal for phase-difference AF method;
- a focus detector configured to perform a focus detection of an image pickup optical system based on an output of the image pickup element;
- a vignetting determination portion configured to determine whether or not an affection of vignetting is included in the focus signal;
- an aperture controller configured to perform a restriction so that an aperture value of an image pickup optical system is equal to or less than a predetermined value in a first mode where the focus detector performs the focus detection and if the vignetting determination portion determines that an affection of vignetting is included in the focus signal, the restriction being not performed in a second mode that is different from the first mode; and
- an exposure controller configured to adjust an exposure condition in accordance with the aperture value restricted by the aperture controller.

10. An image pickup apparatus according to claim 9, wherein the exposure condition includes a charge accumulation time and an exposure sensitivity.

11. An image pickup apparatus according to claim 9, further comprising: the vignetting determination portion is configured to determine whether or not vignetting is generated in the focus detection pixels based on an image height of a position which is a position on the pickup element related to the output as the focus signal and optical information of the image pickup optical system; and
- a calculator configured to calculate the aperture value to reduce the vignetting to less than a predetermined value based on an output of the determination portion.

12. An image pickup apparatus according to claim 11, wherein the optical information includes a focal length, a focal position, and an aperture value before focus detection of the image pickup optical system.

13. An image pickup apparatus according to claim 11, wherein the calculator calculates the aperture value based on the highest image height of image heights of the plurality of focus detection pixels used for the focus detection.

14. An image pickup apparatus according to claim 11, further comprising a selector configured to select an aperture value for the focus detection out of an aperture value giving priority to depth of field and an aperture value for the focus detection in the first mode, wherein the aperture controller sets the aperture value based on an output of the selector.

15. An image pickup apparatus according to claim 9, further comprising: a flicker detector configured to detect a flicker of illumination light; and a switch configured to switch a frame rate of a charge accumulation based on outputs of the flicker detector and the exposure controller.

16. An image pickup apparatus comprising: an image pickup element which includes a plurality of imaging pixels configured to perform a photoelectric conversion of an image formed by a light beam from an image pickup optical system and a plurality of focus detection pixels configured to perform a photoelectric conversion of an image formed by a divided light beam of the light beam from the image pickup optical system;
- a focus detector configured to perform a focus detection of the image pickup optical system based on an output of the focus detection pixels;
- an aperture controller configured to, if an image height of a position is higher than a predetermined position, wherein the position is a position on the pickup element related to the output of the focus signal, perform a restriction so that an aperture value of the image pickup optical system is equal to or less than a predetermined value in a first mode where the focus detector performs the focus detection, the restriction being not performed in a second mode that is different from the first mode; and
- an exposure controller configured to adjust an exposure condition in accordance with the aperture value restricted by the aperture controller.

17. An image pickup apparatus according to claim 16, wherein the exposure condition includes a charge accumulation time and an exposure sensitivity.

18. An image pickup apparatus according to claim 16, further comprising:
- a flicker detector configured to detect a flicker of illumination light; and
- a switch configured to switch a frame rate of a charge accumulation based on outputs of the flicker detector and the exposure controller.

* * * * *